United States Patent
Baker et al.

(10) Patent No.: US 11,371,617 B2
(45) Date of Patent: Jun. 28, 2022

(54) SECONDARY SEAL IN A NON-CONTACT SEAL ASSEMBLY

(71) Applicant: Siemens Energy Global GmbH & Co. KG, Munich (DE)

(72) Inventors: Jonathon Baker, Clover, SC (US); William Halchak, Ft. Mill, SC (US); Douglas J. Arrell, Waxhaw, NC (US); Matthew Kelly, Stanley, NC (US)

(73) Assignee: SIEMENS ENERGY GLOBAL GMBH & CO. KG, Munich (DE)

( * ) Notice: Subject to any disclaimer, the term of this patent is extended or adjusted under 35 U.S.C. 154(b) by 0 days.

(21) Appl. No.: 17/280,600

(22) PCT Filed: Oct. 9, 2018

(86) PCT No.: PCT/US2018/054967
§ 371 (c)(1),
(2) Date: Mar. 26, 2021

(87) PCT Pub. No.: WO2020/076298
PCT Pub. Date: Apr. 16, 2020

(65) Prior Publication Data
US 2022/0034407 A1 Feb. 3, 2022

(51) Int. Cl.
*F16J 15/44* (2006.01)
*F01D 11/02* (2006.01)
(52) U.S. Cl.
CPC .............. *F16J 15/442* (2013.01); *F01D 11/02* (2013.01); *F05D 2220/32* (2013.01); *F05D 2240/55* (2013.01)

(58) Field of Classification Search
CPC .......... F16J 15/44; F16J 15/441; F16J 15/442; F16J 15/443; F01D 11/02; F05D 2220/32; F05D 2240/55
See application file for complete search history.

(56) References Cited

U.S. PATENT DOCUMENTS

| | | | |
|---|---|---|---|
| 2011/0121519 A1 | 5/2011 | Justak | |
| 2016/0102570 A1* | 4/2016 | Wilson | ................... F16F 15/06 277/411 |

(Continued)

FOREIGN PATENT DOCUMENTS

EP 3290646 A1 3/2018

OTHER PUBLICATIONS

PCT International Search Report and Written Opinion of International Searching Authority dated Jun. 24, 2019 corresponding to PCT International Application No. PCT/US2018/054967 filed Oct. 9, 2018.

*Primary Examiner* — Gilbert Y Lee

(57) ABSTRACT

A seal assembly for sealing a circumferential gap between a first machine component and a second machine component which is rotatable relative to the first machine component about a longitudinal axis. The seal assembly includes a seal carrier, a primary seal, a mid plate, at least one secondary seal, and a front plate. The at least one secondary seal interfaces with the front plate and the mid plate. A harder material is introduced at the interface of the mid plate and the front plate with the at least one secondary seal, that is made from a more wear resistant material than the other components at the interface, to provide the other component/s as a wear component that is replaced more often.

7 Claims, 4 Drawing Sheets

(56) References Cited

U.S. PATENT DOCUMENTS

| | | |
|---|---|---|
| 2016/0109025 A1 | 4/2016 | McCaffrey et al. |
| 2016/0130963 A1* | 5/2016 | Wilson et al. |
| 2018/0058240 A1* | 3/2018 | Chuong ............... F01D 9/02 |
| 2018/0363562 A1* | 12/2018 | Chuong .............. F01D 25/04 |
| 2019/0101014 A1* | 4/2019 | DiFrancesco .......... F01D 11/16 |

* cited by examiner

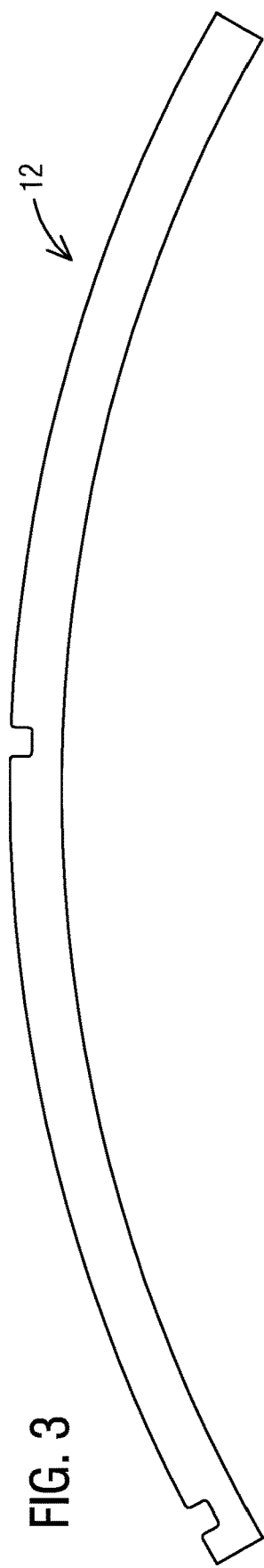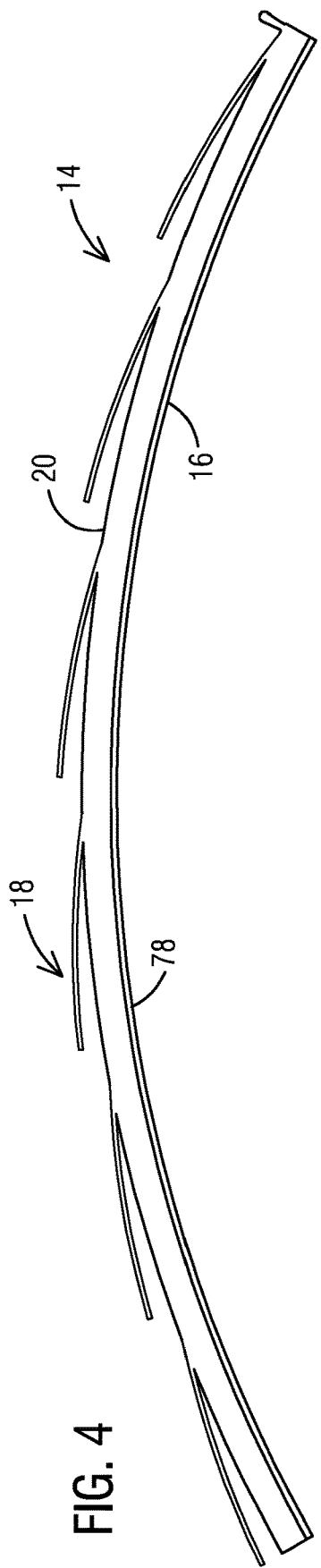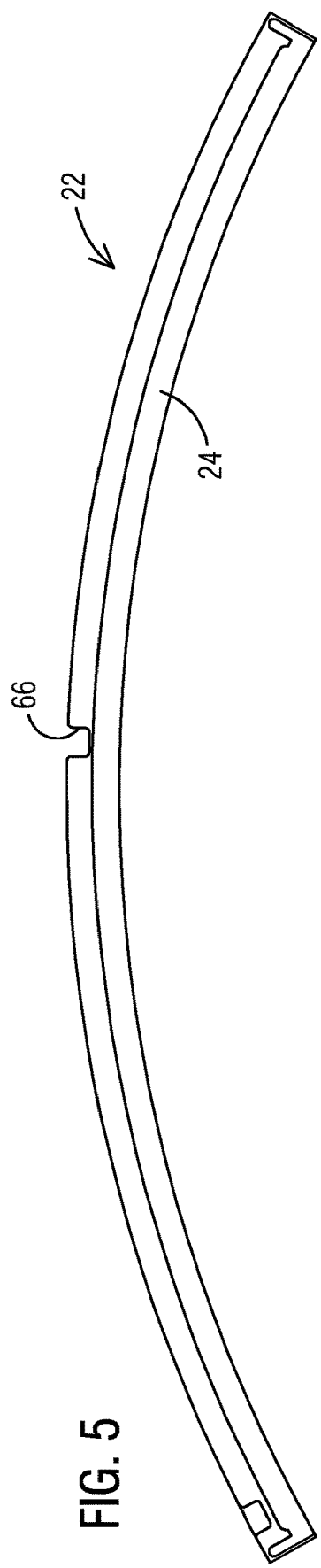

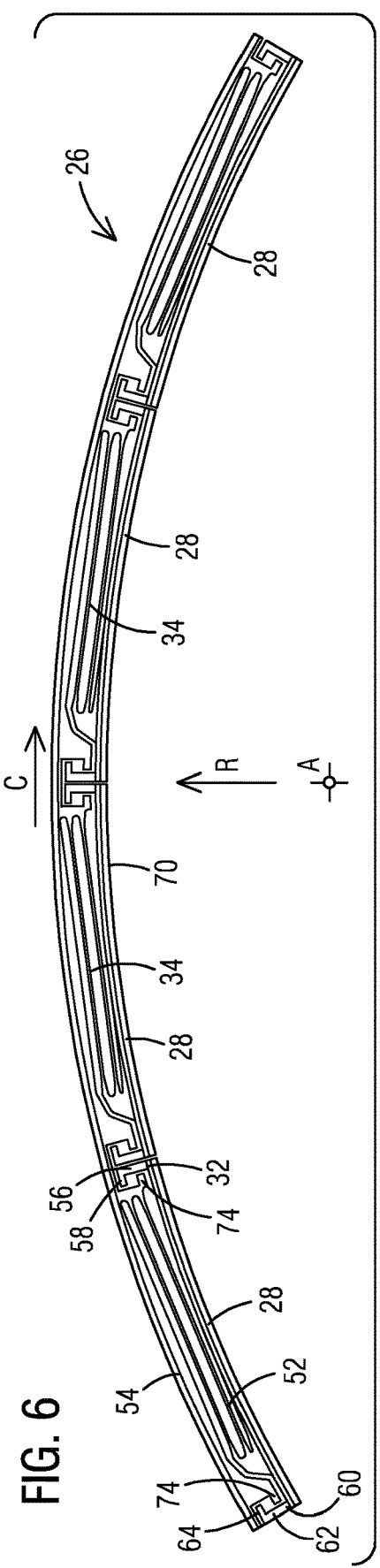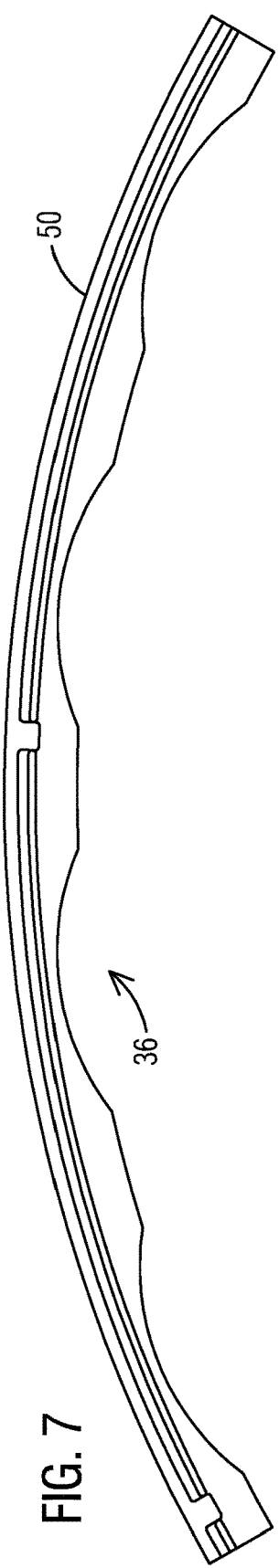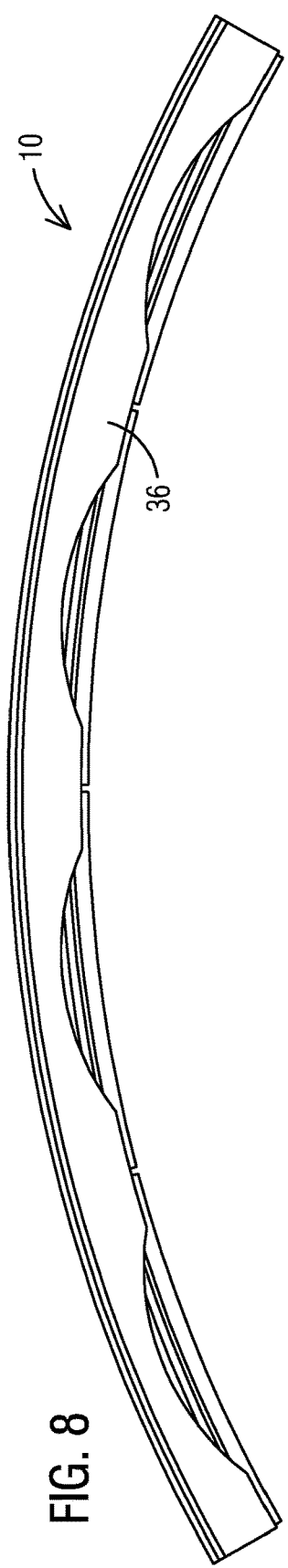

SECONDARY SEAL IN A NON-CONTACT SEAL ASSEMBLY

BACKGROUND

1. Field

The present invention relates to seals for sealing a circumferential gap between two machine components that are relatively rotatable with respect to each other, and, more particularly, to a seal having at least one shoe extending along one of the machine components in a position to create a non-contact seal therewith.

2. Description of the Related Art

Turbomachinery, such as gas turbine engines, currently is dependent on either labyrinth, brush or carbon seals for critical applications. Labyrinth seals provide adequate sealing, but they are extremely dependent on maintaining radial tolerances at all points of engine operation. The radial clearance must take into account factors such as thermal expansion, shaft motion, tolerance stack-ups, rub tolerance, etc. Minimization of seal clearance is necessary to achieve maximum labyrinth seal effectiveness. In addition to increased leakage if clearances are not maintained, there is the potential for increases in engine vibration. Straight-thru labyrinth seals are the most sensitive to clearance changes, with large clearances resulting in a carryover effect. Stepped labyrinth seals are very dependent on axial clearances, as well as radial clearances, which limits the number of teeth possible on each land. Pregrooved labyrinth seals are dependent on both axial and radial clearances and must have an axial clearance less than twice the radial clearance to provide better leakage performance than stepped seals.

Turbomachinery, such as gas turbines engines, are becoming larger, more efficient, and more robust. Large blades and vanes are being utilized, especially in the hot section of the engine system. In view of high pressure ratios and high engine firing temperatures implemented in modern engines, certain components, such as airfoils, e.g., stationary vanes and rotating blades, require more efficient sealing capabilities than the ones that exist currently.

In current assemblies, clearance between the rotating and stationary components in turbomachinery are regions of low performance. There are several drivers of aerodynamic loss in the compressor-vane carrier, turbine-shroud cavity configuration, intermediate shaft, and the like, which lowers the turbomachinery's efficiency. One driver is the flow over the rotating components. The mixing losses that occur downstream of clearance areas are high and contribute to a reduction in stage efficiency and power. Additional mixing losses occur when the flow through the tip cavity combines with the main flow and the two streams have different velocities. Tip leakage is essentially lost opportunity for work extraction. Tip leakage also contributes towards aerodynamic secondary losses.

SUMMARY

In an aspect of the present invention, a seal assembly for sealing a circumferential gap between a first machine component and a second machine component which is rotatable relative to the first machine component about a longitudinal axis in the axial direction, comprises: a seal carrier that holds all the components of the seal assembly together along an outer ring; a primary seal comprising; at least one shoe extending along one of the first and second machine components, producing a non-contact seal therewith, the shoe being formed with a slot; at least one spring element adapted to connect to one of the first and second machine components and being connected to the at least one shoe, the at least one spring element being effective to deflect and move with the at least one shoe in response to fluid pressure applied to the at least one shoe by a fluid stream to assist in the creation of a primary seal of the circumferential gap between the first and second machine components; a mid plate comprising a groove, extending into the slot formed in the at least one shoe; at least one secondary seal comprising at least one sealing element, the at least one sealing element is flush into the groove of the mid plate and extend into the slot formed in the at least one shoe, sealing the at least one spring element in the axial direction; and a front plate adjacent to the at least one sealing element of the secondary seal and extending into the slot formed in the at least one shoe; wherein an interface is created where the at least one secondary seal interfaces with the front plate and the mid plate, a harder material is introduced at the interface, made from a more wear resistant material than the other components at the interface.

These and other features, aspects, and advantages of the present invention will become better understood with reference to the following drawings, description, and claims.

BRIEF DESCRIPTION OF THE DRAWINGS

The invention is shown in more detail by help of figures. The figures show preferred configurations and do not limit the scope of the invention.

FIG. 3 is an elevational view of a portion of an exemplary embodiment of the seal assembly;

FIG. 4 is an elevational view of a portion of an exemplary embodiment of the present invention;

FIG. 5 is an elevational view of a portion of an exemplary embodiment of the present invention;

FIG. 6 is an elevational view of a portion of an exemplary embodiment of the present invention;

FIG. 7 is an elevational view of a portion of an exemplary embodiment of the present invention;

FIG. 8 is an elevational view of an assembled seal assembly of an exemplary embodiment of the present invention.

DETAILED DESCRIPTION

In the following detailed description of the preferred embodiment, reference is made to the accompanying drawings that form a part hereof, and in which is shown by way of illustration, and not by way of limitation, a specific embodiment in which the invention may be practiced. It is to be understood that other embodiments may be utilized, and that changes may be made without departing from the spirit and scope of the present invention.

Broadly, an embodiment of the present invention provides a seal assembly for sealing a circumferential gap between a first machine component and a second machine component which is rotatable relative to the first machine component about a longitudinal axis. The seal assembly includes a seal carrier, a primary seal, a mid plate, at least one secondary seal, and a front plate. The at least one secondary seal interfaces with the front plate and the mid plate. A harder material is introduced at the interface of the mid plate and the front plate with the at least one secondary seal, that is made from a more wear resistant material than the other components at the interface, to provide the other component/s as a wear component that is replaced more often.

Turbomachinery typically includes a compressor section, a combustor, and a turbine section. The compressor section ingests ambient air and compresses it. The compressed air from the compressor section enters one or more combustors in the combustor section. The compressed air is mixed with fuel in the combustors, and an air-fuel mixture is combusted in the combustors to form a hot working gas. The hot working gas is routed to the turbine section, where it is expanded through alternating rows of stationary airfoils and rotating airfoils and used to generate power that can drive a rotor. The expanded gas exiting the turbine section then exhausts from the engine via an exhaust section.

The compressor and turbine sections may include several locations in which there may be gaps, or clearances, between the rotating and stationary components. During engine operation, system loss may occur through fluid leakage through clearances in the compressor and turbine sections. This system loss decreases the operational efficiency of the system. An example of the flow leakage is across a clearance between the tips of rotating blades and a surrounding stationary structure or boundary, such as an outer shroud or a vane carrier.

Seals are necessary to prevent leakage across areas within the gas turbine engine. A non-contact seal that seals a circumferential gap between a first machine component and a second machine component with reduced wear is desired.

Figure 1:
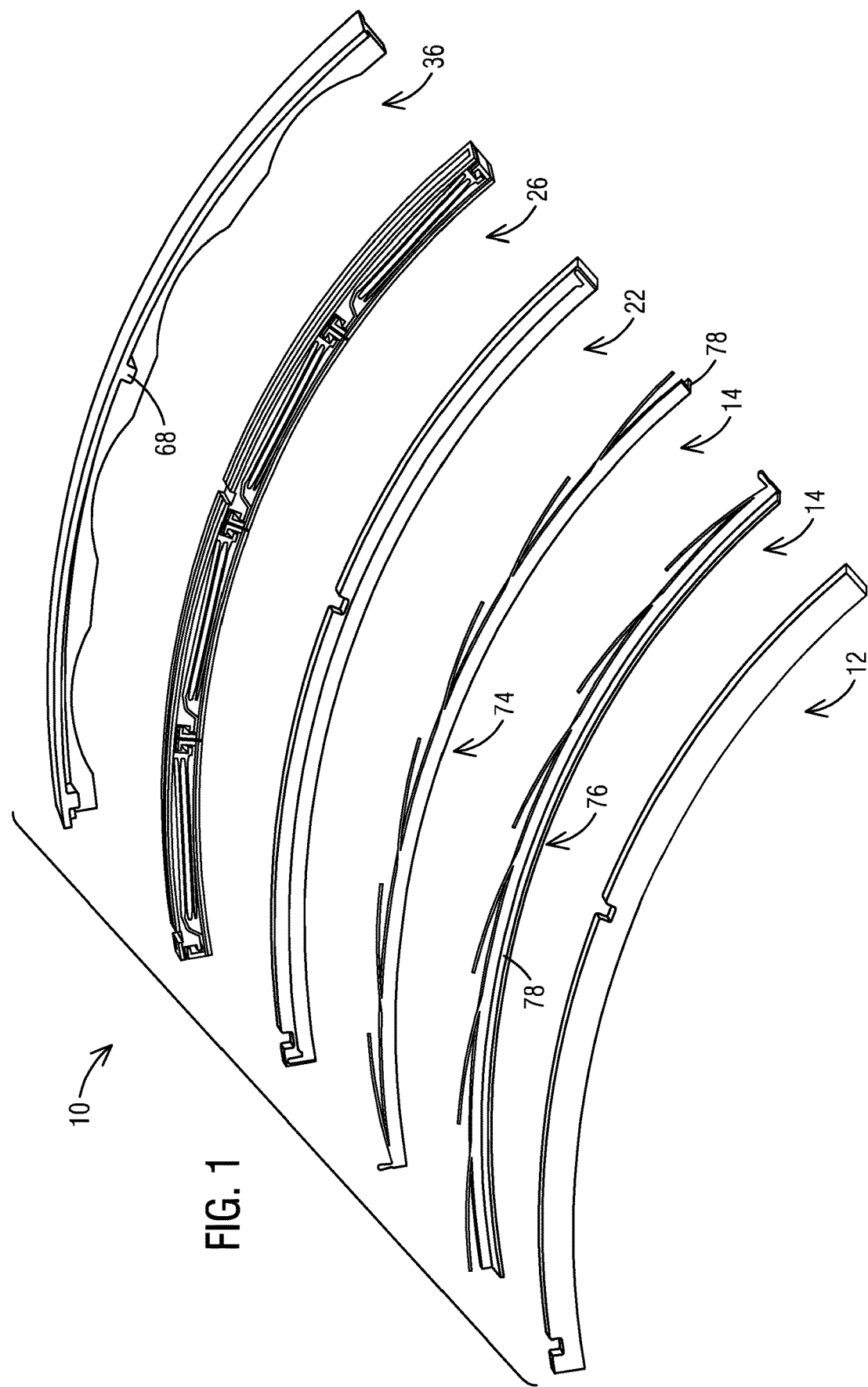
FIG. 1 is an exploded view of a seal assembly of an exemplary embodiment of the present invention.
Figure 2:
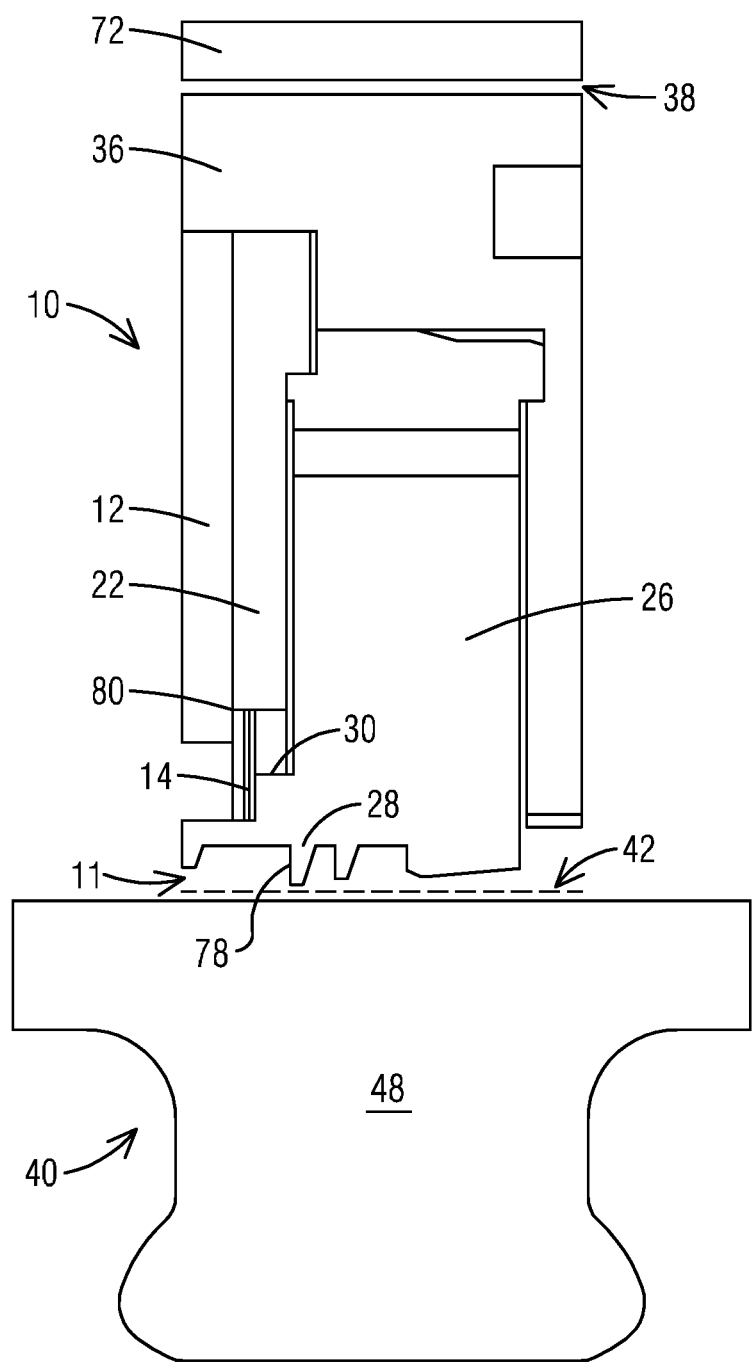
FIG. 2 is an end view of an assembled seal assembly of an exemplary embodiment of the present invention.

FIG. 1 shows an exploded view of a seal assembly 10 embodiment that may be included in turbomachinery, such as a gas turbine. FIG. 2 shows the seal assembly 10 in its assembled form. The seal assembly 10 may include a front plate 12, at least one secondary seal 14, a mid plate 22, a primary seal 26, and a seal carrier 36. The assembled seal assembly 10 illustrated in FIG. 2 creates a non-contact seal of a circumferential gap 11 between two components, a first machine component 38 and a second machine component 40, such as a fixed stator 72 and a rotating rotor 48.

Each seal assembly 10 includes at least one, and in some situations, a plurality of circumferentially spaced shoes 28 that are located in a non-contact position along an exterior surface of the rotor 48, as part of the primary seal 26. Each shoe 28 has a sealing surface 70 and a slot 30 that extends radially inward toward the sealing surface 70 as can be seen in FIGS. 2 and 7. The at least one shoe 28 is formed with two or more projections 78, or fins, relative to one of the machine components, and is the bottom portion of the primary seal 26, as can be seen in FIGS. 2 and 7. For purposes of this discussion, the term "axial" or "axially spaced" refers to a direction along the longitudinal axis 42 of the stator 72 and rotor 48, whereas "radial" refers to a direction perpendicular to the longitudinal axis 42. The seal assembly 10 may extend along a circumferential direction C relative to the turbine longitudinal axis 42.

In certain operating conditions, especially at higher pressures, it is desirable to limit the extent of radial movement of the shoes 28 with respect to the rotor 48 to maintain clearances, e.g. the spacing between the shoes 28, and the facing surface of the rotor 48. The primary seal 26 may include a number of circumferentially spaced spring elements, or at least one spring element 34, as can be better seen in FIG. 7. Each spring element 34 is formed with an inner band 52, and an outer band 54 radially outwardly spaced from the inner band 52. One end of each of the bands 52 and 54 is mounted to, or integrally formed with, the stator 72 and the opposite end thereof is connected to a first stop 32. The first stop 32 includes a leg 56 which is connected to, or integrally formed with a shoe 28, and an arm 58 opposite to the shoe 28, which may be received within a recess formed in the stator 72. The recess has a shoulder 74 positioned in alignment with the arm 58 of the first stop 32.

A second stop 60 is connected to, or integrally formed with, the shoe 28. The second stop 60 is circumferentially spaced from the first stop 32 in a position near the point at which the inner and outer bands 52 and 54 connect to the stator 72. The second stop 60 is formed with a leg 62 and an arm 64. The arm 64 may be received within a recess in the stator 72. The recess has a shoulder 74 positioned in alignment with the arm 64 of the second stop 60.

In certain situations, when seal assembly embodiments are used in applications such as gas turbine engines, aerodynamic forces are developed that can apply a fluid pressure to the shoe 28, causing it to move radially inwardly toward the rotor 48. The spring elements 34 deflect, and move with the shoe 28, to create a primary seal of the circumferential gap 11 between the rotor 48 and stator 72, for instance. The first and second stops 32 and 60 can limit the extent of radially inward and outward movement of the shoe 28, with respect to the rotor 48 in the radial direction R. A gap is provided between the arm 58 of the first stop 32, and the shoulder, and between the arm 64 of the second stop 60, and the shoulder, such that the shoe 28 can move radially inwardly relative to the rotor 48. The inward motion mentioned above is limited by engagement of the arms with the shoulders to prevent the shoe 28 from contacting the rotor 48, or exceeding design tolerances for the gap between the two. The arms can also contact the stator 72 in the event that the shoe 28 moves radially outwardly relative to the rotor 48, to limit movement of the shoe 28 in that direction.

Embodiments include at least one secondary seal 14, that includes at least one sealing element 16, or plate. At least one spring member 18 can be positioned radially outward from the plate, as is shown in FIG. 4, along an outer ring surface 20. In certain embodiments, the at least one sealing element 16 includes two sealing elements 16 oriented side-by-side and positioned so that the plate segments extend into the slot 30 of the at least one shoe 28. The at least one sealing element 16 help to radially deflect and move with the at least one shoe 28, in response to the application of fluid pressure to the at least one shoe 28, in a way that assists in the creation of a secondary seal 14 of the circumferential gap 11 between the first and second machine components 38 and 40. In certain embodiments, the at least one secondary seal 14 includes an aft secondary seal and a forward secondary seal that may be identical and reversed at assembly.

FIG. 6 shows a mid plate 22. The mid plate 22 includes at least one groove 24 along a face of the mid plate 22 that extends into the slot 30 formed in the at least one shoe 28, and is positioned between the at least one secondary seal 14 and the at least one shoe 28 of the primary seal 26. The sealing elements 16 of the at least one secondary seal 14 fits into the groove 24 of the mid plate 22.

FIG. 3 shows a front plate 12. The front plate 12 can be used to cover the components of the seal assembly 10 in the axial direction A. The seal assembly 10 may include having the at least one secondary seal clamped between the front plate 12 and the mid plate 22. The primary seal 26 may support the inner diameter of the secondary seal 14, and the mid plate 22 can support the outer diameter of the secondary seal 14. During operation, the spring member 18 of the secondary seal 14 may react against the mid plate 22.

FIG. 8 shows a seal carrier 36. The seal carrier 36 holds all the components of the seal assembly 10 together along a radially outward position of a radially outer ring 50 of the seal carrier 36. In certain embodiments, along the radially outward surface of the primary seal 26, the mid plate 22, and the front plate 12, there may be a cutout 66. The seal carrier 36, in these embodiments, has a protruding edge 68 that extends radially inward that aligns with the cutouts 66 of the other components to help the components to align in the relative area.

The at least one secondary seal 14 will move while trapped axially between the front plate 12 and the mid plate 22 since there is no circumferential stop. Additionally, the at least one secondary seal 14 is trapped radially between the primary seal 26 and the seal carrier 36. The movement of the at least one secondary seal 14 causes wear where the pressure loads the secondary seals 14. For certain embodiments, the wear will occur on the mid plate 22 due to the pressure loading of the secondary seal 14. Wearing is a common problem in large gas turbines and similar engines and generators and has been known to reduce part life.

Traditionally, non-contact seals have been used in small turbomachinery. As the size of the system increases, there is an increase in the chances of wear of the components. These seals in the past have been made from a material that is consistent among the components such as carbon steel or stainless steel. There is an interface 80 created within the seal assembly 10 where the at least one secondary seal 14 interfaces, or meets, the front plate 12 and mid plate 22. Changing a material at the interface 80 of the front plate 12 and mid plate 22 with the at least one secondary seal 14 can reduce wear on at least one of the components. In certain embodiments, the material of the front plate 12 and the mid plate 22 is changed to harder materials than the at least one secondary seal 14 to reduce wear on the front plate 12 and the mid plate 22. The secondary seal 14 can become a wear component that can be replaced in order to save the other components of the seal assembly 10 for reuse. In another embodiment, it is the secondary seal 14 that is made from harder material than the front plate 12 and the mid plate 22. In this embodiment, the front plate 12 and the mid plate 22 are the components that will have to be replaced during maintenance more often than the rest of the components of the seal assembly 10. The harder material may be from a more wear resistant material than the carbon steel or stainless steel, such as a cobalt alloy, nickel alloy, or the like. Instead of replacing the material of the entire component, the harder material may be a coating such as Tribaloy™ T400, T800, or the like that can be applied to the specific component.

While specific embodiments have been described in detail, those with ordinary skill in the art will appreciate that various modifications and alternatives to those details could be developed in light of the overall teachings of the disclosure. Accordingly, the particular arrangements disclosed are meant to be illustrative only, and not limiting as to the scope of the invention, which is to be given the full breadth of the appended claims, and any and all equivalents thereof.

What is claimed is:

1. A seal assembly for sealing a circumferential gap between a first machine component and a second machine component which is rotatable relative to the first machine component about a longitudinal axis in the axial direction, comprising:
   a seal carrier that holds all the components of the seal assembly together along an outer ring;
   a primary seal comprising:
      at least one shoe extending along one of the first and second machine components, producing a non-contact seal therewith, the shoe being formed with a slot;
      at least one spring element adapted to connect to one of the first and second machine components, and being connected to the at least one shoe, the at least one spring element being effective to deflect and move with the at least one shoe in response to fluid pressure applied to the at least one shoe by a fluid stream to assist in the creation of a primary seal of the circumferential gap between the first and second machine components;
   a mid plate comprising a groove, extending into the slot formed in the at least one shoe;
   at least one secondary seal comprising at least one sealing element, the at least one sealing element is flush into the groove of the mid plate and extend into the slot formed in the at least one shoe, sealing the at least one spring element in the axial direction; and
   a front plate adjacent to the at least one sealing element of the secondary seal and extending into the slot formed in the at least one shoe;
   wherein an interface is created where the at least one secondary seal interfaces with the front plate and the mid plate, wherein the at least one secondary seal, or the front plate and the mid plate, are made with a harder, more wear resistant material than the other interfacing components at the interface.

2. The seal assembly according to claim 1, wherein the at least one secondary seal is made from the harder, more wear resistant material than the front plate and the mid plate.

3. The seal assembly according to claim 1, wherein the front plate and the mid plate are made from the harder, more wear resistant material than the at least one secondary seal.

4. The seal assembly according to claim 1, wherein the at least one secondary seal is made with a coating that is a material that is a harder, more wear resistant material than the front plate and the mid plate.

5. The seal assembly according to claim 1, wherein the front plate and the mid plate are made with a coating that is a material that is a harder, more wear resistant material than the at least one secondary seal.

6. The seal assembly according to claim 1, wherein the harder, more wear resistant material is a nickel alloy.

7. The seal assembly according to claim 1, wherein the harder, more wear resistant material is a cobalt alloy.

* * * * *